(12) United States Patent
Fox

(10) Patent No.: US 9,803,356 B2
(45) Date of Patent: Oct. 31, 2017

(54) RADON GAS MITIGATION SYSTEMS AND APPARATUS

(71) Applicant: 0984494 B.C. LTD., Victoria (CA)

(72) Inventor: Randi Fox, Victoria (CA)

(73) Assignee: Terra Vent Systems Inc., Victoria (CA)

( * ) Notice: Subject to any disclaimer, the term of this patent is extended or adjusted under 35 U.S.C. 154(b) by 11 days.

(21) Appl. No.: 14/847,228

(22) Filed: Sep. 8, 2015

(65) Prior Publication Data

US 2015/0376895 A1    Dec. 31, 2015

Related U.S. Application Data

(63) Continuation of application No. PCT/CA2014/050198, filed on Mar. 7, 2014.
(Continued)

(51) Int. Cl.
*E04B 1/70* (2006.01)
*E04F 17/00* (2006.01)
(Continued)

(52) U.S. Cl.
CPC .............. *E04B 1/62* (2013.01); *E04C 2/44* (2013.01); *F24F 7/00* (2013.01); *B08B 15/00* (2013.01);
(Continued)

(58) Field of Classification Search
CPC ........ F24F 7/10; F24F 7/06; F24F 7/00; F24F 2003/1696; F24F 2001/0055;
(Continued)

(56) References Cited

U.S. PATENT DOCUMENTS 4,381,630 A * 5/1983 Koester ................ E04B 1/7023
52/169.5
4,620,398 A    11/1986 Wallin
(Continued)

FOREIGN PATENT DOCUMENTS

CA    2761810 A1    6/2012
EP    1475574 A2    11/2004
(Continued)

OTHER PUBLICATIONS

Product Data Sheet: "Foamular Insul-Drain Extruded Polystyrene (XPS) Insulation Board", Owens Corning, Aug. 2011.
(Continued)

*Primary Examiner* — Chi Q Nguyen
(74) *Attorney, Agent, or Firm* — Oyen Wiggs Green & Mutala LLP

(57) ABSTRACT

A building panel may be installed below a slab in the construction of buildings. The building panel supports the slab and also provides a ventilation layer that may be depressurized to eliminate or reduce infiltration of radon gas into the building. The ventilation layer may comprise channels which provide a two-dimensionally interconnected void. Ventilation panels which include collars for connecting to ventilation systems may be provided. The panels may be installed directly on compacted soil. The building panels may additionally provide sub-slab insulation and/or a capillary break for water drainage. In some embodiments the building panels are formed substantially entirely of thermal insulating material such as rigid polystyrene foam. In an example embodiment the panels are approximately 4 inches thick and have a grid of intersecting channels formed on an underside of the panels.

23 Claims, 6 Drawing Sheets

Related U.S. Application Data

(60) Provisional application No. 61/775,203, filed on Mar. 8, 2013.

(51) Int. Cl.

| | | |
|---|---|---|
| *E04B 1/62* | (2006.01) | |
| *F24F 7/00* | (2006.01) | |
| *E04B 2/00* | (2006.01) | |
| *E02D 31/00* | (2006.01) | |
| *F24F 7/06* | (2006.01) | |
| *F24F 7/10* | (2006.01) | |
| *F24F 3/16* | (2006.01) | |
| *B08B 15/00* | (2006.01) | |
| *F24F 1/00* | (2011.01) | |
| *F24F 11/00* | (2006.01) | |

(52) U.S. Cl.
CPC ............ *E02D 31/00* (2013.01); *E02D 31/008* (2013.01); *F24F 7/06* (2013.01); *F24F 7/10* (2013.01); *F24F 2001/0055* (2013.01); *F24F 2003/1696* (2013.01); *F24F 2007/001* (2013.01); *F24F 2011/003* (2013.01); *Y02B 30/78* (2013.01); *Y10S 454/909* (2013.01)

(58) Field of Classification Search
CPC ............... F24F 2007/001; Y02B 30/78; Y10S 454/909; B08B 15/00; E02D 31/00; E02D 31/008
USPC ......... 52/302.3, 302.1, 302.7, 309.1, 309.16, 52/408, 169.5, 413, 169.14
See application file for complete search history.

(56) References Cited

U.S. PATENT DOCUMENTS

| | | | |
|---|---|---|---|
| 4,798,034 A | 1/1989 | Jarnagin et al. | |
| 4,843,786 A * | 7/1989 | Walkinshaw | E04B 1/74 454/186 |
| 4,938,124 A | 7/1990 | Garza | |
| 4,943,185 A * | 7/1990 | McGuckin | E02D 31/02 210/170.07 |
| 4,988,237 A | 1/1991 | Crawshaw | |
| 5,003,750 A * | 4/1991 | Delgado | E02D 31/008 405/229 |
| 5,083,500 A * | 1/1992 | Francis | B08B 9/0495 454/341 |
| 5,101,712 A | 4/1992 | Dean, Jr. | |
| 5,473,847 A | 12/1995 | Crookston | |
| 5,474,400 A | 12/1995 | Kliefoth et al. | |
| 5,771,643 A | 6/1998 | Parker | |
| 5,775,039 A * | 7/1998 | McPherson | E04B 1/7023 52/169.5 |
| 6,101,775 A * | 8/2000 | Larimore | E04F 15/02405 454/247 |
| 6,543,189 B1 * | 4/2003 | Wood, Jr. | E04B 1/7023 405/129.7 |
| 6,672,016 B2 | 1/2004 | Janesky | |
| 7,386,957 B2 * | 6/2008 | Duffney | B08B 15/02 405/128.2 |
| 7,536,835 B2 * | 5/2009 | Schluter | E04F 15/08 52/302.1 |
| 7,559,832 B2 * | 7/2009 | Kilmer | F24B 1/00 454/340 |
| 7,856,767 B2 * | 12/2010 | Janesky | E02D 31/02 405/229 |
| 8,007,205 B2 * | 8/2011 | Marshall, III | B32B 27/12 405/229 |
| 8,544,219 B1 | 10/2013 | Janesky | |
| 2010/0251638 A1 | 10/2010 | Freeman | |
| 2011/0283641 A1 | 11/2011 | Aubut | |
| 2011/0302862 A1 | 12/2011 | Lloyd et al. | |

FOREIGN PATENT DOCUMENTS

| | | |
|---|---|---|
| EP | 1972735 A1 | 9/2008 |
| GB | 2478342 A | 9/2011 |
| GB | 2484831 A | 4/2012 |
| JP | 2005-188050 A | 7/2005 |
| JP | 2009-263958 A | 11/2009 |
| WO | 0157329 A1 | 8/2001 |
| WO | 02066749 A1 | 8/2002 |
| WO | 2009154561 A1 | 12/2009 |
| WO | 2013117824 A1 | 8/2013 |

OTHER PUBLICATIONS

Finnfoam Insulation Boards, Finnfoam Oy, RT K-36028en, Jan. 2001, pp. 1-4.
United States Environmental Protection Agency, "Radon Mitigation Standards", Air and Radiation, EPA 402-R-93-078, Oct. 1993.
United States Environmental Protection Agency, "Passive Radon Control System for New Construction", EPA 402-9512, May 1995.
Hatton, Thomas, "Designing Efficient Sub Slab Venting and Vapor Barrier Systems for Schools and Large Buildings", 2010 International Radon Symposium, Columbus, OH, pp. 112-113.
"Foamular Insul-Drain Extruded Polystyrene (XPS) Insultation Board", Owens Corning Foam Insulation, LLC, Aug. 1, 2011, pp. 1-4.

* cited by examiner

RADON GAS MITIGATION SYSTEMS AND APPARATUS

CROSS-REFERENCE TO RELATED APPLICATIONS

This application is a continuation of PCT International Application No. PCT/CA2014/050198 filed 7 Mar. 2014, which claims priority from U.S. Application No. 61/775,203 filed 8 Mar. 2013. For purposes of the United States, this application claims the benefit under 35 U.S.C. §119 of U.S. Application No. 61/775,203 filed 8 Mar. 2013, and entitled COMBINED SUB-SLAB RADON GAS MITIGATION & INSULATION PANELS which is hereby incorporated herein by reference for all purposes.

TECHNICAL FIELD

The invention relates to buildings and more specifically to systems and apparatus for preventing radon gas from accumulating in buildings.

BACKGROUND

Radon is a naturally-occurring radioactive gas created from the decay of uranium, which is found in rock, soil and water. When radon is created it normally dissipates into the atmosphere. However, buildings can trap radon where it can become concentrated enough to be a health hazard.

Different countries have different guidelines relating to the management of radon. Health Canada's guidelines provide that remedial measures should be undertaken in a dwelling whenever the average annual radon concentration exceeds 200 becquerels per cubic meter (200 Bq/m$^3$) in the normal occupancy area. The US Environmental protection Agency guidelines for maximum exposure are 150 becquerels per cubic meter (150 Bq/m$^3$).

Both the Canadian National Building Code and the US International Building Code have Radon mitigation requirements. Health Canada recommends that the construction of new dwellings should employ techniques that will minimize radon entry and will facilitate post-construction radon removal, should this subsequently prove necessary. One radon reduction method is Active Soil Depressurisation (ASD). ASD involves inserting a pipe through a hole drilled through a basement floor. A fan draws the radon gas from under the floor and pushes it outside.

A radon ventilation system (RVS) can be provided in new construction to prevent buildings from trapping radon. A RVS may be used in homes, apartments or other buildings. A RVS may be made by placing a layer of coarse gravel or perforated pipes underneath the basement slab and withdrawing air from the layer of coarse gravel or perforated pipes.

There are issues with using gravel to create an under-slab airflow layer. Gravel may be in limited supply or prohibitively expensive in the region where the building is being constructed. A gravel layer may not work depending on the gravel supply and installation procedure. Gravel may itself release radon gas. Relying on perforated piping to remove radon is prone to failure as radon may not migrate into the piping.

There is a need for effective, reliable and affordable systems for preventing the buildup of radon gas in dwellings and other buildings.

SUMMARY

This invention has a number of aspects. One aspect provides systems for radon mitigation. Another aspect provides apparatus which may be used as components of such systems. The present disclosure provides several embodiments, including the following:

Embodiment 1 provides a ventilation panel comprising a generally planar body having first and second opposed surfaces and a ventilation layer on the second surface of the body. The ventilation layer provides a two-dimensionally interconnected void and the ventilation panel has a load-bearing capacity in a transverse direction of at least 150 pounds per square foot (about 4.8 kPa).

Embodiment 2 provides a ventilation panel according to embodiment 1 wherein the ventilation layer comprises a plurality of support pads projecting from the second surface, the support pads spaced apart from one another to provide the interconnected void.

Embodiment 3 provides a ventilation panel according to embodiment 1 wherein the body comprises a thermally-insulating material.

Embodiment 4 provides a ventilation panel according to embodiment 3 wherein the thermally insulating material comprises a rigid foam.

Embodiment 5 provides a ventilation panel according to embodiment 4 wherein the rigid foam comprises polystyrene.

Embodiment 6 provides a ventilation panel according to any one of embodiments 3 to 5 wherein the ventilation layer comprises a plurality of support pads projecting from the second surface, the support pads spaced apart from one another to provide the interconnected void.

Embodiment 7 provides a ventilation panel according to embodiment 6 wherein the support pads are formed of the thermally insulating material.

Embodiment 8 provides a ventilation panel according to embodiment 7 wherein the support pads are integral with the body.

Embodiment 9 provides a ventilation panel according to any one of embodiments 1 through 7 wherein the interconnected void is provided by a plurality of interconnected channels.

Embodiment 10 provides a ventilation panel according to embodiment 9 wherein the channels have widths narrower than 3 inches.

Embodiment 11 provides a ventilation panel according to any one of embodiments 9 and 10 wherein the channels have widths exceeding one-eighth inch.

Embodiment 12 provides a ventilation panel according to any one of embodiments 9 to 11 wherein the channels comprise a first set of parallel channels arranged to intersect with channels of a second set of parallel channels.

Embodiment 13 provides a ventilation panel according to any one of embodiments 1 to 12 wherein the first and second surfaces are spaced apart from one another by a distance of 6 inches or less.

Embodiment 14 provides a ventilation panel according to any one of embodiments 2 and 6 wherein the support pads each have a length shorter than 2 inches.

Embodiment 15 provides a ventilation panel according to any one of embodiments 2, 6, and 14 wherein the support pads have a length longer than ½ inch.

Embodiment 16 provides a ventilation panel according to any one of embodiments 2, 6, 14, and 15 wherein the support pads are spaced apart from one another in an array such that adjacent ones of the support pads are spaced apart by distances of 3 inches or less.

Embodiment 17 provides a ventilation panel according to any one of embodiments 2, 6, and 14 to 16 wherein adjacent ones of the support pads are spaced apart from one another by distances greater than one-eighth inch.

Embodiment 18 provides a ventilation panel according to any one of embodiments 2, 6, and 14 to 17 wherein the support pads comprise prisms, trapezoids, cubes or conical forms.

Embodiment 19 provides a ventilation panel according to any one of embodiments 1 to 18, wherein the insulating body and the ventilation layer are made from different materials.

Embodiment 20 provides a ventilation panel according to embodiment 19, wherein the ventilation layer comprises one or more of nylon, vinyl, polyvinyl chloride.

Embodiment 21 provides a ventilation panel as defined in any one of embodiments 19 and 20, wherein the ventilation layer comprises non-woven nylon or rock wool.

Embodiment 22 provides a ventilation panel according to any one of embodiments 1 to 21 wherein the volume of the interconnected void relative to the volume of the supporting pads is at between 5% to 80%.

Embodiment 23 provides a ventilation panel according to any one of embodiments 1 to 22 wherein the interconnected void has a volume that is at least 20% of a volume of the ventilation layer.

Embodiment 24 provides a ventilation panel according to any one of embodiments 1 to 23 wherein the interconnected void has a volume of at least 1¼ cubic inches per square foot of the panel.

Embodiment 25 provides a ventilation panel according to any one of embodiments 1 to 24 wherein the panel has an insulating value of at least R8.

Embodiment 26 provides a ventilation panel according to embodiment 25 wherein the panel has an insulating value of R6 to R14.

Embodiment 27 provides a ventilation panel according to any one of embodiments 1 to 26 comprising at least one knockout configured to be removable to provide a ventilation opening through the body and into the interconnected void.

Embodiment 28 provides a ventilation panel according to any one of embodiments 1 to 27 comprising an aperture extending through the body to the interconnected void and a collar sealed to the aperture, the collar comprising a fitting on the first side of the body, the fitting configured for coupling to a ventilation conduit.

Embodiment 29 provides a building construction comprising a panel according to any one of embodiments 1 to 28 arranged with the ventilation layer beneath the body, a concrete slab poured on top of the panel, and a ventilation system connected to withdraw air from the interconnected void.

Embodiment 30 provides a building construction according to embodiment 29 wherein the panel comprises an aperture, and the ventilation system comprises a collar fitting extending through the concrete slab and connected to draw air through the aperture.

Embodiment 31 provides a building construction according to embodiment 30 comprising an exhaust pipe inserted through the collar fitting.

Embodiment 32 provides a building construction according to embodiment 31 wherein the exhaust pipe comprises a ventilation stack extending to a vent located outside the building.

Embodiment 33 provides a building construction according to any one of embodiments 29 to 32 comprising an impervious barrier between the panel and the concrete slab.

Embodiment 34 provides a building construction as defined in embodiment 33, wherein the impervious barrier comprises a polyethylene barrier.

Embodiment 35 provides a building construction as defined in any one of embodiments 31 and 32, further comprising a fan operatively connected to the exhaust pipe wherein the fan actively removes gases from the interconnected void.

Embodiment 36 provides a building construction as defined in any one of embodiments 30 to 32 and 35, comprising a sump pit located under the aperture.

Embodiment 37 provides a ventilation panel comprising a generally planar body of a closed cell foam material having first and second opposed surfaces and a ventilation layer on the second surface of the body. The ventilation layer provides a two-dimensionally interconnected void.

Embodiment 38 provides a ventilation panel according to embodiment 37 wherein the ventilation layer comprises a plurality of support pads projecting from the second surface, the support pads spaced apart from one another to provide the interconnected void.

Embodiment 39 provides a ventilation panel according to embodiment 38 wherein the support pads are formed of the closed cell foam material.

Embodiment 40 provides a ventilation panel according to any one of embodiments 38 and 39 wherein the support pads are formed integrally with the body.

Embodiment 41 provides a ventilation panel according to any one of embodiments 37 to 40 wherein the closed cell foam material comprises a polystyrene foam.

Embodiment 42 provides a ventilation panel according to any one of embodiments 37 to 41 wherein the interconnected void is provided by a plurality of interconnected channels.

Embodiment 43 provides a ventilation panel according to embodiment 42 wherein the channels comprise first and second sets of set of intersecting channels Embodiment 44 provides a ventilation panel according to embodiment 43 wherein the channels of the first set of channels are parallel to one another and the channels of the second set of channels are parallel to one another.

Embodiment 45 provides a ventilation panel according to any one of embodiments 42 to 44 wherein the channels have widths narrower than 3 inches.

Embodiment 46 provides a ventilation panel according to any one of embodiments 42 to 45 wherein the channels have widths exceeding one-eighth inch.

Embodiment 47 provides a ventilation panel according to any one of embodiments 37 to 46 wherein the first and second surfaces are spaced apart from one another by a distance of 6 inches or less.

Embodiment 48 provides a ventilation panel according to any one of embodiments 37 to 47 wherein the volume of the interconnected void relative to the volume of the supporting pads is in the range of 5% to 80%.

Embodiment 49 provides a ventilation panel according to any one of embodiments 37 to 48 wherein the interconnected void has a volume that is at least 20% of a volume of the ventilation layer.

Embodiment 50 provides a ventilation panel according to any one of embodiments 37 to 49 wherein the interconnected void has a volume of at least 1¼ cubic inches per square foot of the panel.

Embodiment 51 provides a ventilation panel according to any one of embodiments 37 to 50 wherein the panel has an insulating value of at least R8.

Embodiment 52 provides a ventilation panel according to embodiment 51 wherein the panel has an insulating value of R6 to R14.

Embodiment 53 provides a ventilation panel according to any one of embodiments 37 to 52 comprising at least one knockout configured to be removable to provide a ventilation opening through the body and into the interconnected void.

Embodiment 54 provides a ventilation panel according to any one of embodiments 37 to 53 comprising an aperture extending through the body to the interconnected void and a collar sealed to the aperture, the collar comprising a fitting on the first side of the body, the fitting configured for coupling to a ventilation conduit.

Embodiment 55 provides a ventilation panel according to any one of embodiments 37 to 54, wherein the insulating body and the ventilation layer are made from different materials.

Embodiment 56 provides a ventilation panel according to any one of embodiments 37 to 55, wherein the ventilation layer comprises one or more of nylon, vinyl, polyvinyl chloride.

Embodiment 57 provides a ventilation panel as defined in any one of embodiments 37 to 56, wherein the ventilation layer comprises non-woven nylon or rock wool.

Embodiment 58 provides a building construction comprising a panel according to any one of embodiments 37 to 57 arranged with the ventilation layer beneath the body, a concrete slab on top of the panel, and a ventilation system connected to withdraw air from the interconnected void.

Embodiment 59 provides a building construction according to embodiment 58 wherein the panel comprises an aperture, and the ventilation system comprises a collar fitting extending through the concrete slab and connected to permit air to flow through the aperture.

Embodiment 60 provides a building construction according to embodiment 59 further comprising an exhaust pipe coupled to the collar fitting.

Embodiment 61 provides a building construction according to embodiment 60 wherein the exhaust pipe comprises a ventilation stack extending outside the building.

Embodiment 62 provides a building construction according to any one of embodiments 58 to 61 comprising an impervious barrier between the panel and the concrete slab.

Embodiment 63 provides a building construction according to embodiment 62, wherein the impervious barrier comprises a polyethylene barrier.

Embodiment 64 provides a building construction according to any one of embodiments 59 to 63 comprising a fan operatively connected to draw air from the interconnected void through the aperture.

Embodiment 65 provides a building construction as defined in any one of embodiments 59 to 64, comprising a sump pit located under the aperture.

Further aspects and example embodiments are illustrated in the accompanying drawings and/or described in the following description.

BRIEF DESCRIPTION OF THE DRAWINGS

The accompanying drawings illustrate non-limiting example embodiments of the invention.

DETAILED DESCRIPTION OF EXAMPLE EMBODIMENTS

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Figure 1:
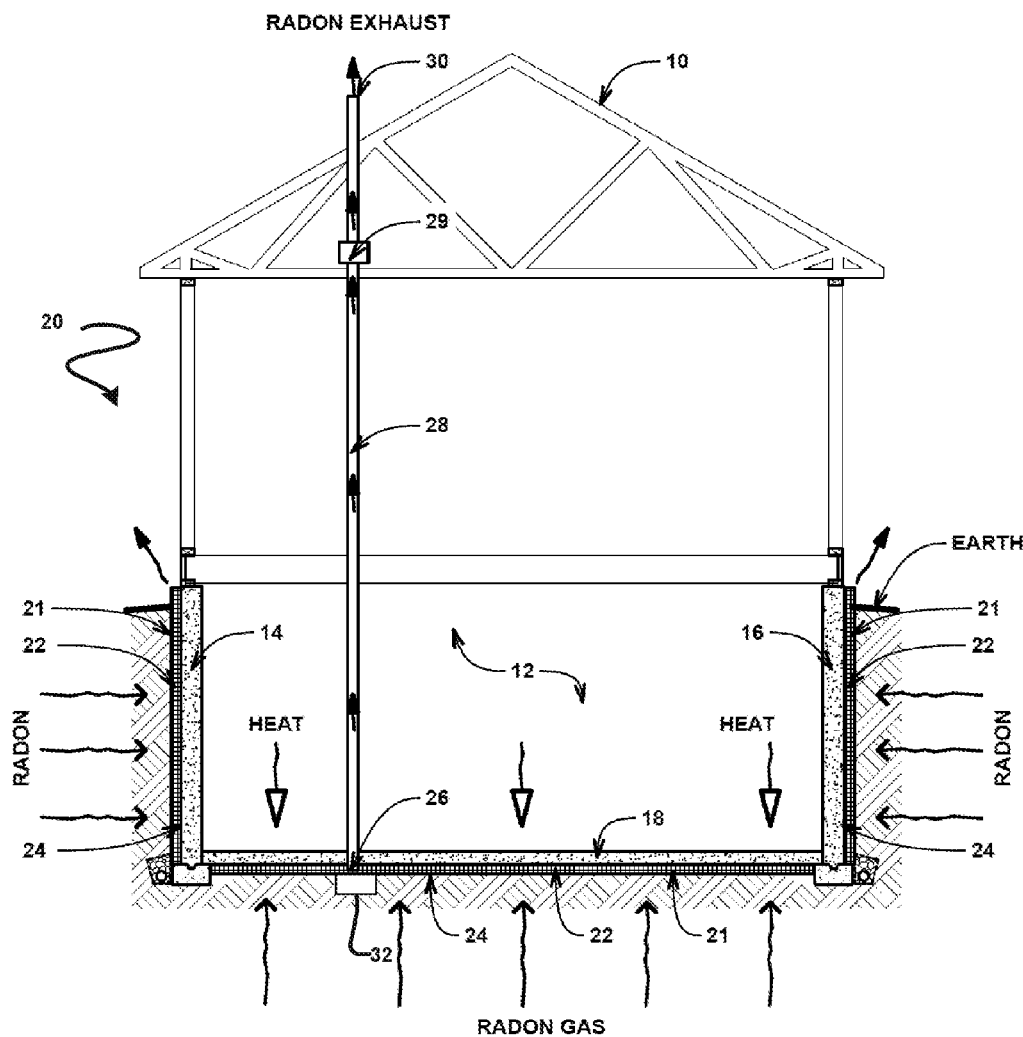
FIG. 1 shows an example radon ventilation system in a building.

FIG. 1 depicts building 10 having a basement area 12. Basement area 12 comprises foundation walls 14, 16 and basement slab 18. If building 10 is in an area where radon is present, radon gas from the soil under and surrounding building 10 may infiltrate into basement area 12 and may subsequently accumulate to unhealthy levels in building 10, especially in basement area 12.

Building 10 has a radon ventilation system 20. Radon ventilation system 20 comprises panels 21 that underlie slab 18. Panels 21 support slab 18 and provide an airflow layer 24 under slab 18. Panels 21 also optionally but advantageously provide thermal insulation on the underside of slab 18. In the illustrated embodiment, panels 21 provide an insulation layer 22 between slab 18 and airflow layer 24. Thus, in the illustrated embodiment, panels 21 provide a supporting substrate for slab 18, provide thermal insulation under slab 18 and also provide an airflow layer which permits depressurization under slab 18 to prevent the entry of radon into building 10 from the underlying soil. The airflow layer may also optionally but advantageously function as a capillary break to dissipate groundwater pressure and facilitate its drainage. A water drainage system not shown may be provided to withdraw any water that enters airflow layer 24.

Airflow layer 24 permits air containing radon gas to travel freely in two dimensions under slab 18. One or more vent conduits 26 are coupled to airflow layer 24 and provide routes to draw air containing radon gas through vent conduit 26 into vent stack 28 to exit building 10 through exhaust point 30. The flow of air from airflow layer 24 through vent stack 28 may be driven passively. For example, air carrying radon gas may be caused to flow by a natural stack effect created by the positioning of vent stack 28 and exhaust point 30. In addition or in the alternative, the flow of air from airflow layer 24 out vent stack 28 may be actively driven, for example, a fan 29 in vent conduit 26 may exhaust air from airflow layer 24. Some embodiments provide active depressurization wherein air is withdrawn from airflow layer 24 at a rate such that an air pressure within airflow layer 24 is lower than an air pressure in basement 12.

In the illustrated embodiment, panels 21 are also provided on outsides of foundation walls 14, 16 below grade. Panels 21 provide insulation and additionally provide airflow passages from which radon gas can be diverted before it enters building 10. Vertical panels 21 arranged around the outside of a foundation may be arranged to provide an airflow layer that vents passively at the upper edges of panels 21 to allow radon to dissipate into the atmosphere. The airflow layer of vertical panels 21 may additionally provide a capillary break to dissipate groundwater pressure and facilitate its drainage. A perimeter drainage system may be arranged below the lower edges of vertical panels 21 to drain water from the airflow layer provided by vertical panels 21.

A sump pit 32 may optionally be provided below vent conduit 26 to prevent blockage of vent conduit 26 by water or other materials. Other under-slab drainage may optionally be provided.

Figure 1A:
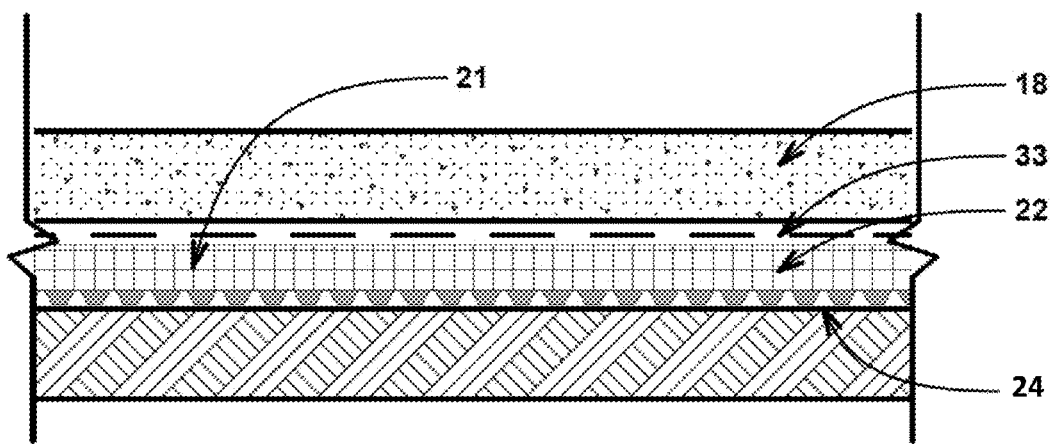
FIG. 1A shows a partially schematic detailed view of a construction that includes a panel underlying and supporting a slab.

FIG. 1A is a partially schematic detailed view of a construction that includes a panel 21 underlying and supporting a slab 18. This embodiment includes an impervious barrier 33 between panels 21 and slab 18. The impervious barrier may, for example, comprise a membrane such as a polyethylene sheet. In a typical application, barrier 33 may comprise a 6 mm thick polyethylene barrier lapped and sealed between insulation layer 22 and slab 18.

Figure 2:
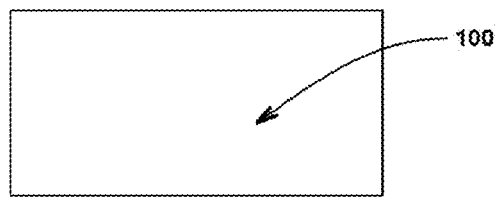
FIG. 2 is a top plan view of an example sub-slab ventilation panel.
Figure 3:
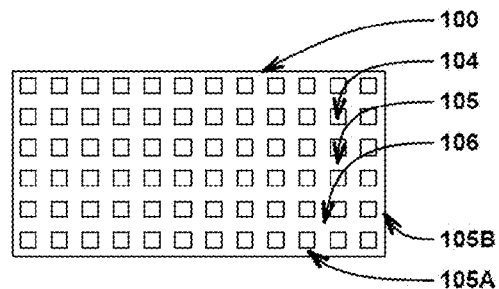
FIG. 3 is a bottom plan view of the FIG. 2 panel.
Figure 4:
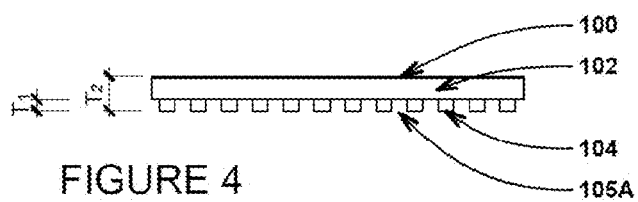
FIG. 4 is a side elevation view of the FIG. 2 panel.

FIGS. 2-4 depict an example sub-slab panel 100 that may be used as a panel 21. Panel 100 provides an airflow layer 24 which is made up by a plurality of support pads 104 that are defined between airflow channels 105 which collectively provide an interconnected void 106. Interconnected void 106 is configured such that airflow between two points in void 106 can occur through multiple paths. Thus, isolated blockages of one or more channels 105 are unlikely to prevent air from reaching a vent conduit 26 (not shown). In the embodiments illustrated in FIGS. 2 to 4, channels 105 include a first set of channels 105A that intersect with channels 105B of a second set of channels.

A panel may have any suitable size. In some non-limiting embodiments, panels like panel 100 or any other embodiment is rectangular and has sides in the range of 1 to 12 feet in length. For example, panels as described herein may have dimensions of 4 feet by eight feet for some applications. It is convenient but not mandatory for panels as described herein to have overall length and width dimensions that are multiples of a basic unit used in construction such as multiples of 6 or 12 inches for construction based on imperial measurements or multiples of 10, 20, 50 or 100 centimeters for construction based on metric measurements.

In the illustrated embodiment channels 105 terminate at spaced-apart locations along each side of panel 100 such that two or more panels 100 may be abutted to provide a continuous airflow layer. While it is not mandatory, it is convenient for channels 105A to be parallel to one another and to make channels 105B parallel to one another. In such embodiments, support pads may be square, rectangular or parallelogram-shaped. In one embodiment as shown, for example, in FIGS. 3 and 3A, interconnected void 106 is formed by crossing perpendicular channels 105A and 105B. Channels 105A, 105B may, for example, form a waffle or grid pattern to an appropriate depth over the entire surface of panel 100. Support pads of other shapes may be provided in alternative embodiments. For example, support pads may be round, oval-shaped, triangular, etc.

A wide range of other configurations for the channels are possible. For example, channels 105 could radiate outwardly from one or more nodes, channels 105 could follow curving paths etc. Where channels 105 include channels that are parallel to one another it is not mandatory that the channels run parallel to edges of the panel. For example, the channels could run at a non-parallel, non-perpendicular angle to an edge of the panel. The channels could, for example, run at an angle in the range of 15 to 75 degrees to an edge of the panel. In embodiments where the panel comprises sets of intersecting channels there could be two or more sets of intersecting channels. For example some embodiments may have three sets of intersecting channels. The three sets of intersecting channels may define support pads that have triangular shapes.

In some embodiments the insulating layer of panel 100 (or other layer supporting support pads 104) projects outwardly past support pads 104 along the peripheral edges of the panel 100 such that void 106 can be continuous between abutting panels 100 even if channels 105 on one panel 100 are not aligned with corresponding channels 105 on the abutting panel 100.

Figure 3A:
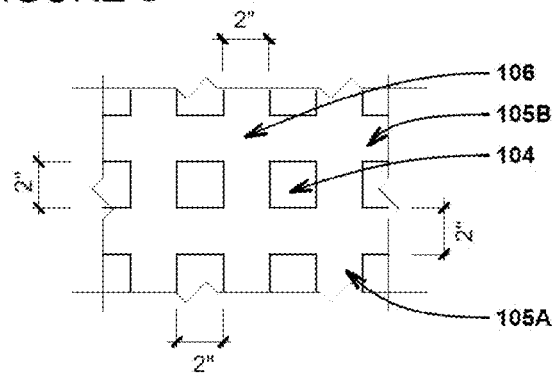
FIG. 3A is a magnified view of a section of FIG. 3.

FIG. 3A is a magnified view of a section of the panel 100 of FIG. 3 depicting support pads 104, interconnected void 106, and channels 105A, 105B. The dimensions indicated in FIG. 3A are illustrative only and may be varied. FIG. 4 is a side elevation view of panel 100.

The widths, depths and cross-sectional shapes of channels 105 may be varied. In some embodiments, channels 105 have cross-sectional areas such that the total volume of interconnected void 106 is in the range of 20% to 80% of the volume of the layer containing channels 105. In some embodiments, the total volume of interconnected void 106 occupies more than 20% or 30% of the volume of the layer containing channels 105. The layer containing channels 105 may have a total volume equal to an area of the panel multiplied by the depth of channels 105. In some embodiments the interconnected void has a volume of at least 1¼ cubic inches per square foot of the panel.

The widths and depths of channels 105 may be chosen based on various factors including:
- achieving a desired volume for void 106;
- maintaining an area of support pads 104 sufficient to support slab 18 and its designed loading with a suitable safety factor;
- maintaining a desired insulation value;
- providing a panel that is strong enough to maintain its integrity in reasonable handling prior to installation and during pouring of slab 18; and
- achieving a free flow of air through void 106.

Some of these design factors will depend on the properties of the material from which panel 100 is made and/or on the overall thickness of panel 100. For specific applications a panel may be custom-engineered. Factors such as the width of channels, the area of bearing surfaces (e.g. support pads) the depths of channels, the properties of the material of which the panel is made and the like may be determined based on design parameters such as one or more of: the required load bearing capacity, the properties of underlying soil, the usage of the building, the rate at which radon is produced at the location of the building, etc.

In an example embodiment, panel 100 has an overall thickness of 4 inches (about 10 cm) and channels 105 have a depth of about 1 inch (about 2½ cm). Channels 105 may, for example, have depths in the range of about ⅜ inch to about 2 inches. In some embodiments, channels 105 penetrate in the range of about 1/10 to about ½ of the overall thickness of panel 100.

Making channels 105 not too wide, e.g. less than 3 inches or so, can tend to make panel 100 better able to withstand handling during installation and pouring of slab 18. In some embodiments, channels 105 have widths in the range of about ⅛ inch (about ¼ cm) to about 3 inches (about 7½ cm). In an example embodiment (see e.g. FIG. 5C) channels 105A-C, 105B-C have widths $W_C$ of about 2 inches. It is not mandatory that all of channels 105 have the same widths or that the width of any one channel 105 remain constant along its length.

Figure 4A:
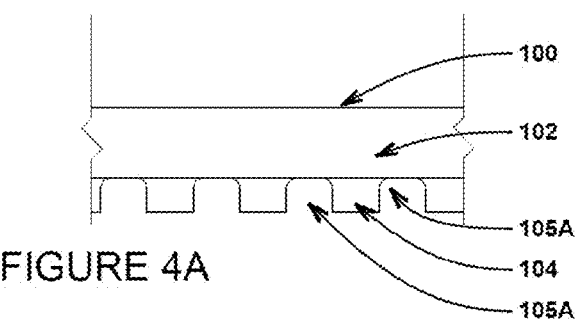
FIG. 4A is an expanded cross-sectional view of a panel showing an example channel profile.

Forming channels 105 to have cross-sectional shapes such that the corners formed at the intersections of channels 105 and the surface of panel 100 are curved rather than sharp can be advantageous in enhancing air flow, reducing noise from air flow, preserving the appearance of panel 100 during handling and/or reducing the likelihood that small chunks of the material of panel 100 could break off during installation. FIG. 4A is an expanded cross-sectional view through a set of channels 105 which have a rounded cross-sectional profile.

Channels 105 may have smooth walls to facilitate airflow. Such smooth walls may, for example, be formed by extrusion, hot-wire cutting etc.

The dimensions of support pads 104 may vary. Where a panel 100 is designed to support a certain loading each area of the panel should have enough support pads 104 with a sufficient area to support the desired loading without exceeding a bearing capacity of the soil and without exceeding the strength of the material of support pads 104. In many cases this is not overly limiting since properly compacted soil at a building site will typically have a maximum loading well in excess of the loading specified for a basement floor. For example, for some applications a panel 100 may be designed to support a loading of about 300-600 lb/sq feet when installed on compacted soil that can support a loading of, for example, 3000 pounds per square foot. In some embodiments panels as described in any of the example embodiments herein provide a load-bearing capacity in a transverse direction of at least 150 pounds per square foot (about 4.8 kPa)

As shown in FIG. 4 an example embodiment of a panel has support pads 104 which have a thickness dimension $T_1$ of about ½ inch to 2 inches (corresponding to channels of a depth $T_1$. FIG. 3A shows example support pads 104 which have a width dimension W and a length dimension L of about 2 inches.

Support pads 104 may be formed of the same material as the rest of panel 100 or a different material. Physical properties of the material of panel 100 may be selected for compatibility with the conditions under slab 18, to provide desired load-carrying ability, and to provide other desired characteristics such as a desired insulating value. In some embodiments, panel 100 comprises a thermally-insulating material and support pads 104 are also made of the thermally-insulating material. In some embodiments, panels 100 are made of closed-cell foam materials. Example materials from which panel 100 may be fabricated include thermally-insulating materials such as expanded polystyrene foam, extruded polystyrene foam, and soy foam. In some embodiments the material of panel 100 is a material, which may be a foam material, having a minimum compressive strength exceeding 10 psi (pounds per square inch). In some embodiments the minimum compressive strength of the material of a panel 100 is at least 20, 30, 40 or 60 or more psi.

Panel 100 may be constructed to provide a desired insulating R-value. Considerations such as the environment or legislative requirements may influence the desired R-value. A desired R-value may be achieved by varying the thickness $T_2$ of a continuous layer 100A of panel 100 from which support pads 104 project. In some embodiments, panels 100 provide an R-value in the range of 6 to 20, for example an R-value of 12.

A panel 100 may be fabricated by any of a wide variety of methods. In one method material is removed from a sheet of insulating material (e.g. by cutting) to form channels 105 in a crossing pattern to an appropriate depth. In another example method, an insulating ventilation panel 100 is made by extruding or casting an insulating foam material into a mold which is shaped to form channels 105. In another example method a panel is made by attaching support pads or a layer of material that has been shaped to provide support pads or a layer of a material that otherwise provides an interconnected void is attached to an insulating panel. Another method may create a insulating ventilation panel 100 by first extruding or casting or otherwise forming support pads 104 with material such as nylon, vinyl, or polyvinyl chloride and then fastening support pads 104 to the bottom of an insulating body 102.

Figure 7:
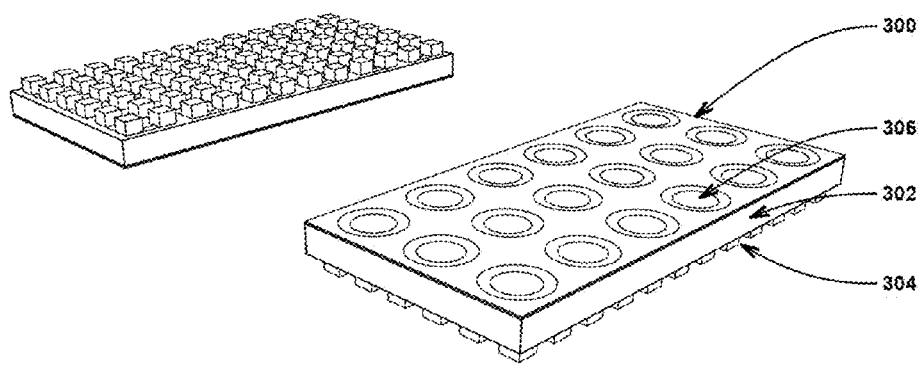
FIG. 7 is a top elevation view of an embodiment of the insulating ventilation panel showing a plurality of vent knockouts.

In some embodiments, panels 100 have formed in them knockouts at one or more locations for receiving vent conduits. An installer may remove a knockout at a location at which it is desired to install a vent conduit and then mate a vent conduit to the aperture so-formed in panel 100. FIG. 7 shows an example panel 300 comprising a plurality of exhaust vent knockouts 306. Exhaust vent knockouts 306 are removable sections of the insulating body 302 and optionally removable sections of support pads 304. An installer can select the location of a vent conduit by removing out one of the exhaust vent knockouts 306. Multiple vent conduits can be created if desired by removing multiple exhaust vent knockouts 306. As an alternative to using knockouts 306, an installer may cut a hole through a panel 100 at a location desired for a vent using, for example, as suitably-sized hole saw, a hand saw, knife or the like. In some embodiments, a panel 100 includes markings to indicate suitable locations for making vent openings through the panel.

In some embodiments, differently-configured venting panels are provided. Such venting panels may be supplied with a venting aperture pre-formed, one or more knockouts for venting apertures, or a venting conduit already sealed in place. In such embodiments a venting panel may be placed at location(s) at which it is desired to vent void 106.

In some embodiments the venting panels are smaller than other panels 100. For example, panels 100 may be rectangular having a length longer than a width. Venting panels for use with such panels 100 may have a longest dimension equal to the width of panels 100. Such venting panels may, for example, be square or rectangular. Various example venting panels are illustrated in FIGS. 5A through 5D.

Figure 5A:
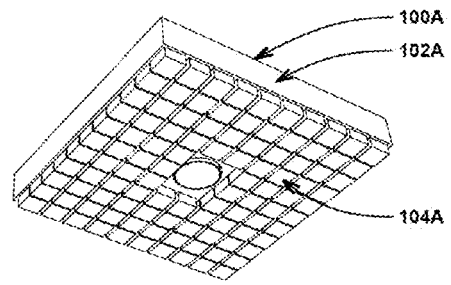
FIG. 5A is a bottom elevation view of an example insulating ventilation panel showing having prismatic support pads.
Figure 5B:
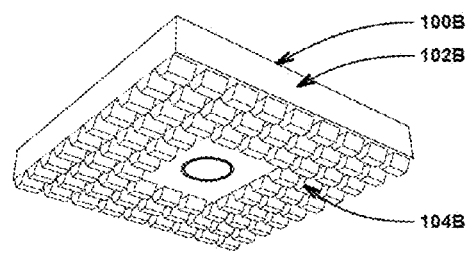
FIG. 5B is a bottom elevation view of an example insulating ventilation panel having trapezoidal support pads.
Figure 5C:
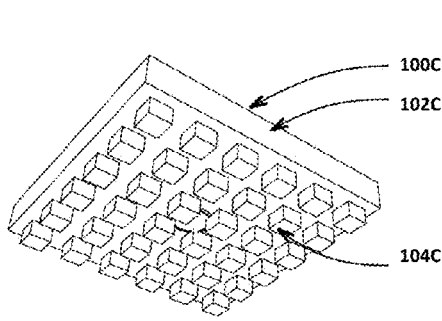
FIG. 5C is a bottom elevation view of an example insulating ventilation panel having cube-like support pads.
Figure 5D:
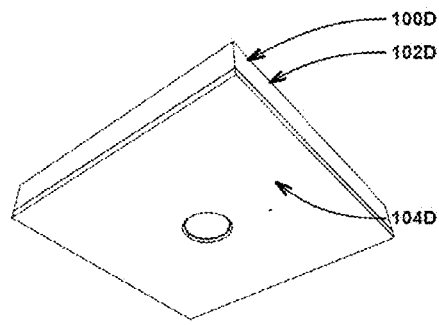
FIG. 5D is a bottom elevation view of a further example insulating ventilation panel having a supporting air permeable layer beneath an insulating body.

The example venting panels of FIGS. 5A through 5D have various alternative arrangements of channels and support pads. Regular panels 100 may also use such arrangements of channels and support pads. FIGS. 5A, 5B, and 5C show example insulating ventilation panels 100A, 100B, and 100C, respectively. The airflow layer of insulating ventilation panels 100A, 100B, and 100C are similar to panel 100 except that support pads 104A, 104B and 104C have different forms and dimensions. The figures depict that support pads 104 may be shaped as prisms 104A, trapezoids 104B or cubes 104C. In other example embodiments, support pads comprise truncated conical forms FIG. 5D depicts a further embodiment of the insulating ventilation panel 100D. In this embodiment, panel 100D comprise an insulating body 102D (such as a sheet of a rigid insulation) and an air permeable layer 104D. Insulating body 102D and air permeable layer 104D may be fastened together in any suitable manner. Air permeable layer 104D may be made of material such as non-woven nylon, rock wool or other similar breathable material capable of supporting the expected loads plus an appropriate safety factor while allowing relatively unrestricted airflow.

A panel as illustrated in FIG. 5A may be made, for example, by milling or sawing channels 105 to provide support pads 104A between the channels. A panel as illustrated in FIG. 5B may be made, for example as a composite in which support pads 104B are made of a different material than the body of the panel. For example, the support pads may be made of PVC or nylon or vinyl while the body is made of a closed-cell foam. A panel as illustrated in FIG. 5C may be made, for example, by moulding or casting. A panel as shown in FIG. 5D may be made, for example, by attaching the ventilation layer to the body. These examples of fabrication methods are non-limiting examples only.

Figure 6:
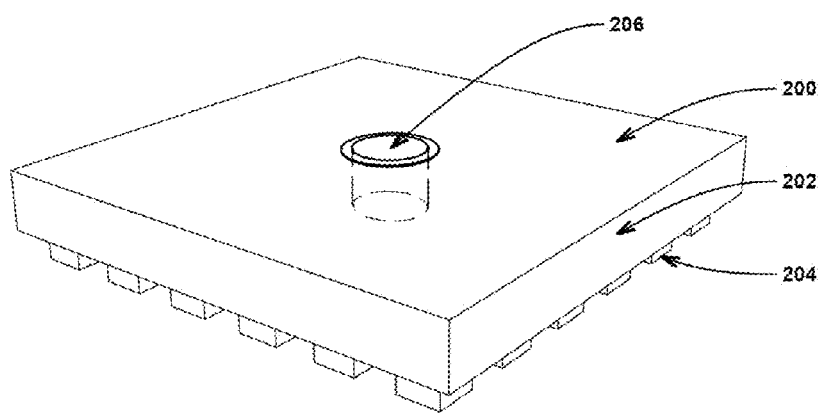
FIG. 6 is a top elevation view of an embodiment of the insulating ventilation panel showing a vent conduit.

FIG. 6 depicts an example insulating ventilation panel 200 comprising an insulating body 202 and support pads 204. In addition, insulating ventilation panel 200 has vent conduit 206. Vent conduit 206 extends through insulating body 202. In some embodiments support pads 204 adjacent to vent conduit 206 may be absent to permit greater airflow and decreased chances vent conduit 206 is blocked. In other embodiments, there may be more than one vent conduit 206. Additional vent conduits allow radon-containing air to be vented vent from multiple exits.

Figure 8:
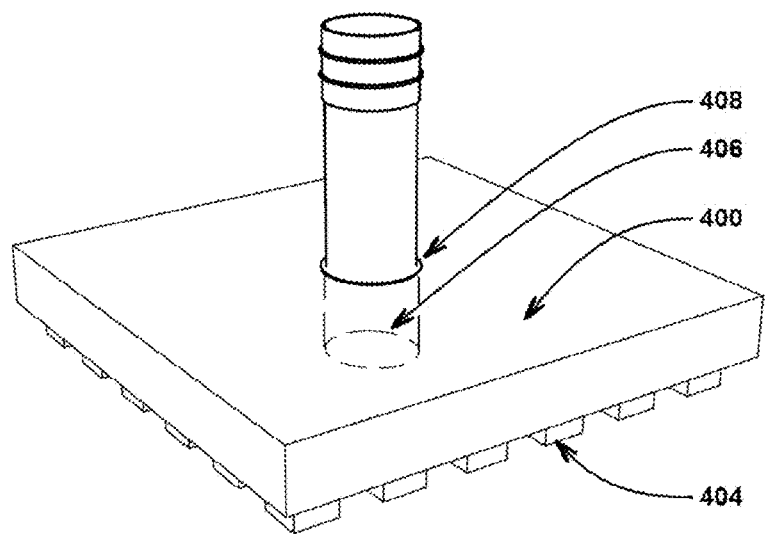
FIG. 8 is a top elevation view of an embodiment of the insulating ventilation panel showing a collar fitting.

FIG. 8 shows an example insulating ventilation panel 400. A collar fitting 408 is connected to vent conduit 406. Collar fitting 408 can be mounted on the top or bottom of vent conduit 406. In some embodiments of insulating ventilation panel 400, collar fitting 408 is cast into vent conduit 406. Collar fitting 408 can be, for example made of ABS, PVC, plastic or metal and may be configured to be coupled to conventional plumbing or venting piping. In some embodiments support pads 404 are provided.

Panels 100 may be used in construction by preparing a layer of compacted soil to receive a slab. The soil may be as-found at the building site, gravel, or the like. It is not required that the soil have any specific permeability to air since a highly-permeable two-dimensionally interconnected void is provided by the panels themselves. Any desired sub-slab features such as sumps, sub-slab water-drainage etc. may be installed at this stage. After this has been done, panels 100 may be laid directly on the soil with the air-permeable layer down and support pads (if the embodiment of panels being used has support pads) in contact with the soil. Panels 100 are installed abutting against one another such that their airflow layers provide a continuous two-dimensionally connected void between panels 100 and the underlying soil. Panels 100 may be cut to fit the area of the proposed slab. One or more vent openings connected to the interconnected void are provided. This may be done by any one or more of: cutting a hole of a desired size in a panel 100 at the location of a desired vent opening and installing a collar to interface to the hole; removing a pre-formed knockout at the desired location and installing a collar to interface to the resulting hole; placing a venting panel having a pre-installed collar at the desired vent location etc.

A barrier layer is provided on top of the panels. In some embodiments the panels are sufficiently impermeable that a barrier layer may be provided by sealing strips of a suitable material along the joints between abutting panels 100. In some embodiments a barrier layer such as a polyethylene sheet is applied over panels 100 (suitably lapped and sealed at any joints). After the barrier layer has been applied a concrete slab may be poured. The venting collar(s) may be connected to suitable ventilation systems.

Panels as described herein are not limited to application under slabs. Such panels may also be used under foundations (as long as they are designed to support the required foundation loading which will often be larger than the loading required for under-slab materials). Such panels may also be used in place of ordinary insulation panels.

INTERPRETATION OF TERMS

Unless the context clearly requires otherwise, throughout the description and the
"comprise", "comprising", and the like are to be construed in an inclusive sense, as opposed to an exclusive or exhaustive sense; that is to say, in the sense of "including, but not limited to";
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A building construction comprising:
   a ventilation panel, the ventilation panel comprising:
   a generally planar body having first and second opposed surfaces; and
   a ventilation layer on the second surface of the body, the ventilation layer providing a two-dimensionally interconnected void;
   the ventilation panel arranged with the ventilation layer beneath the body;
   a concrete slab poured on top of and supported by the ventilation panel; and
   a ventilation system connected to withdraw air from the interconnected void;
   wherein the body of the ventilation panel supports a lowermost part of the concrete slab above an uppermost part of the two-dimensionally interconnected void.

2. A building construction according to claim 1 wherein the ventilation panel has a load-bearing capacity in a transverse direction of at least 150 pounds per square foot (about 4.8 kPa).

3. A building construction according to claim 1 wherein the ventilation panel comprises an aperture, and the ventilation system comprises a collar fitting extending through the concrete slab and connected to draw air through the aperture.

4. A building construction according to claim 3 comprising an exhaust pipe inserted into the collar fitting wherein the exhaust pipe comprises a ventilation stack extending to a vent located outside the building.

5. A building construction according to claim 4 comprising a fan operatively connected to the exhaust pipe wherein the fan actively removes gases from the interconnected void.

6. A building construction according to claim 3 comprising an impervious barrier between the panel and the concrete slab wherein the impervious barrier comprises a polyethylene barrier.

7. A building construction according to claim 1, comprising a sump pit located under the aperture.

8. A building construction according to claim 1 wherein the ventilation layer comprises a plurality of support pads projecting from the second surface, the support pads spaced apart from one another to provide the interconnected void.

9. A ventilation panel according to claim 8 wherein the body projects outwardly past the support pads along the peripheral edges of the ventilation panel.

10. A building construction according to claim 8 wherein the support pads are integral with the body.

11. A building construction according to claim 10 wherein the support pads comprise prisms, trapezoids, cubes or conical forms.

12. A building construction according to claim 8 wherein a volume of the interconnected void relative to a volume of the supporting pads is between 5% to 80%.

13. A building construction according to claim 12 wherein the thermally insulating material comprises a rigid foam.

14. A building construction according to claim 1 wherein the body comprises a thermally-insulating material.

15. A building construction according to claim 1 wherein the interconnected void is provided by a plurality of interconnected channels.

16. A building construction according to claim 15 wherein the channels have widths narrower than 3 inches.

17. A building construction according to claim 15 wherein the channels comprise a first set of parallel channels arranged to intersect with channels of a second set of parallel channels.

18. A building construction according to claim 1, wherein the body and the ventilation layer are made from different materials.

19. A building construction according to claim 18, wherein the ventilation layer comprises one or more of nylon, vinyl, polyvinyl chloride.

20. A building construction according to claim 18, wherein the ventilation layer comprises non-woven nylon or rock wool.

21. A building construction according to claim 1 wherein the building construction with one another to provide a continuous airflow layer under the slab, each of the additional ventilation panels comprising:
   a generally planar body having first and second opposed surfaces; and
   a ventilation layer on the second surface of the body, the ventilation layer comprising a plurality of support pads projecting from the second surface to provide a two-dimensionally interconnected void wherein the support pads are spaced apart from one another to provide the interconnected void.

22. A building construction according to claim 21 wherein the body of the additional ventilation panels projects outwardly past the support pads along the peripheral edges of the additional ventilation panels to provide channels in the ventilation layers along abutting edges of the additional ventilation panels.

23. A building construction according to claim 1 comprising additional ventilation panels on an outside of a foundation below grade, the additional ventilation panels arranged around the outside of the foundation with the airflow layer of the additional ventilation panels vented at upper edges of the additional ventilation panels.

* * * * *